US007516977B2

(12) United States Patent
Wu et al.

(10) Patent No.: US 7,516,977 B2
(45) Date of Patent: Apr. 14, 2009

(54) SEAT ADJUSTING MECHANISM OF A MOTORIZED WHEELCHAIR

(75) Inventors: Hung-Sheng Wu, Kaoshiong (TW); Shun-Yuan Ju, Chia-I (TW)

(73) Assignee: Cycling & Health Tech Industry R&D Center, Taichung (TW)

( * ) Notice: Subject to any disclaimer, the term of this patent is extended or adjusted under 35 U.S.C. 154(b) by 455 days.

(21) Appl. No.: 11/392,796

(22) Filed: Mar. 30, 2006

(65) Prior Publication Data

US 2007/0235965 A1 Oct. 11, 2007

(51) Int. Cl.
*B62B 1/00* (2006.01)

(52) U.S. Cl. ............... 280/650; 280/47.38; 297/344.17; 254/122

(58) Field of Classification Search .............. 280/47.38, 280/650, 638, 29, 47.33, 287, 278, 639, 47.25; 297/344.12, 344.15, 344.17, 344.16, 330; 248/421, 371, 185.1, 396, 398, 454; 187/243, 187/244, 269, 272, 211; 254/122, 211, 269
See application file for complete search history.

(56) References Cited

U.S. PATENT DOCUMENTS

| | | | | | |
|---|---|---|---|---|---|
| 3,179,072 | A * | 4/1965 | Coriell | ....................... | 108/145 |
| 3,794,283 | A * | 2/1974 | Furno | ....................... | 248/278.1 |
| 4,245,849 | A * | 1/1981 | Thiboutot | .................... | 280/20 |
| 5,161,812 | A * | 11/1992 | DeWeese | ................. | 280/47.38 |
| 5,996,716 | A * | 12/1999 | Montiglio et al. | .......... | 180/65.5 |
| 6,032,976 | A * | 3/2000 | Dickie et al. | ................ | 280/650 |
| 6,170,914 | B1 * | 1/2001 | Chang | ........................ | 297/339 |
| 6,776,430 | B2 * | 8/2004 | White et al. | ............. | 280/304.1 |
| 2004/0108689 | A1 * | 6/2004 | Nguyen | ...................... | 280/651 |

* cited by examiner

*Primary Examiner*—Christopher P Ellis
*Assistant Examiner*—Chiedu A Chibogu
(74) *Attorney, Agent, or Firm*—WPAT, P.C.; Anthony King

(57) ABSTRACT

The purpose of this invention is to enhance the stability of seat up-down adjustment and the aesthetics of a wheelchair. The mechanism is structured by the cart frame, the seat, the linking rod mechanism and the linear motion actuator. There are at least two linking rod mechanisms, each mechanism is composed of several connecting frames and pivot-linked with each others and remains two distal ends for connecting to the cart frame and the seat. The linear motion actuator connects the cart frame and the seat, moves the seat up and down smoothly with help from the stable supporting of the linking rod mechanism. The whole adjustment mechanism is confined in between the seat and the cart frame, which minimizes the needed space and makes a nice figure.

16 Claims, 7 Drawing Sheets

SEAT ADJUSTING MECHANISM OF A MOTORIZED WHEELCHAIR

FIELD OF THE INVENTION

This present invention relates to a seat adjusting mechanism of a motorized wheelchair, specifically a kind of linking rod mechanism which is structured by a cart frame, a seat and plurality connecting frames pivot-linked with each others, the seat moves smoothly up and down relatively to the cart frame, driven by a linear motion actuator, the linking rod mechanism is hidden in a way of nice figure.

BACKGROUND OF THE INVENTION

There are varieties of wheelchairs, most of the conventional wheelchairs do not have seat adjusting mechanisms, recently to enhance convenience and comfort in use, some seats are designed with up-down adjustable or lean adjustable mechanism. However, the current common seen wheelchair seat adjusting mechanism moves the seat up and down by a simple linking rod with actuator, e.g. U.S. Pat. No. 5,924,720, the seat is up-down adjustable with a 4 linking-rod mechanism composed of continuous 2 linking rod in between the cart frame and the seat frame together with a linear motion actuator, this commonly applied mechanism takes a lot of space which makes driving difficult and inconvenient in transportation. There are some other kinds of well known wheelchairs equip with seat up-down adjusting mechanisms, but there is nothing like this invention which is a mechanism designed to minimize space and is hidden in a way of nice figure.

In addition to the function of seat up-down adjustment, the main mechanism of this invention can be extended in design to have a function of seat lean adjustment. A current common seen wheelchair has the function of seat lean adjustment, i.e. U.S. Pat. No. 6,776,430, which has a linking rod and an actuator between the cart frame and the seat frame; a guide rail which rising gradually and extending to the front is installed on the cart frame; a slide which installed on the seat frame which slides along the guide, when the actuator pulls back, the rear side of the seat frame is pulled forward and raised, then the seat frame is leaned. However, it does not have the function to control the seat up and down; furthermore, the guide rail is rising and extending to the front, when the seat is leaned, the height of the seat is increased, which causes unstable, uncomfortable and dangerous to the rider.

SUMMARY OF THE INVENTION

The purpose of this invention is to enhance the stability of the seat up-down adjustment and the aesthetics of a wheelchair. The mechanism is structured by the cart frame, the seat, the linking rod mechanism and the linear motion actuator. There are at least two linking rod mechanisms, each mechanism is composed of several connecting rods in even number and pivot-linked with each others, and connected to the cart frame and the seat at the two ends. The linear motion actuator connects a cart frame and a seat, moves the seat up and down smoothly with help from the stable supporting of the linking rod mechanism. The whole adjustment mechanism is confined in between a seat and a cart frame, which minimizes the needed space and makes a nice figure.

DETAILED DESCRIPTION OF THE PREFERRED EMBODIMENT

Figure 1:
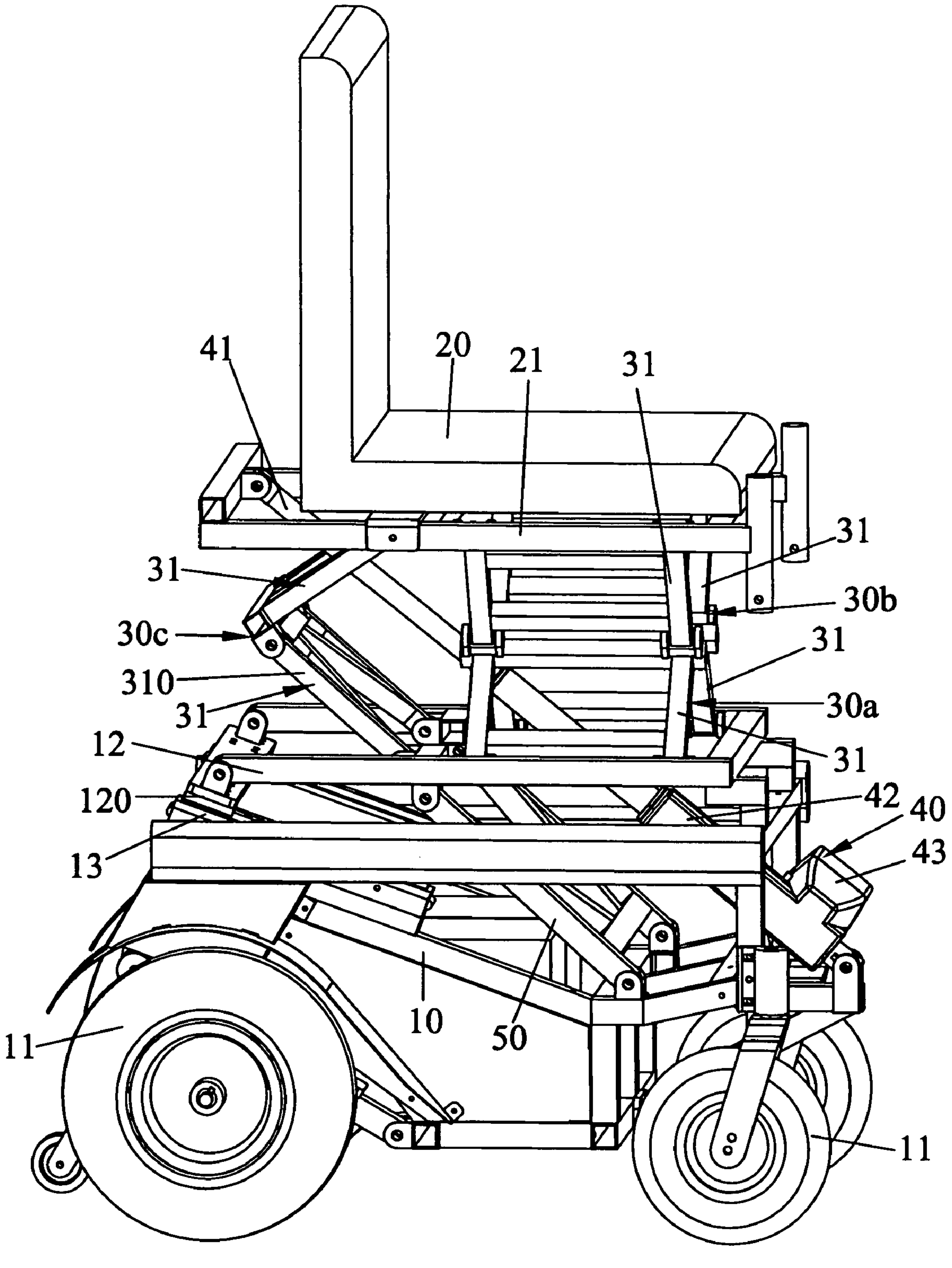
FIG. 1 is a 3-dimensional diagram showing the rising status of the seat of the present invention.
Figure 2:
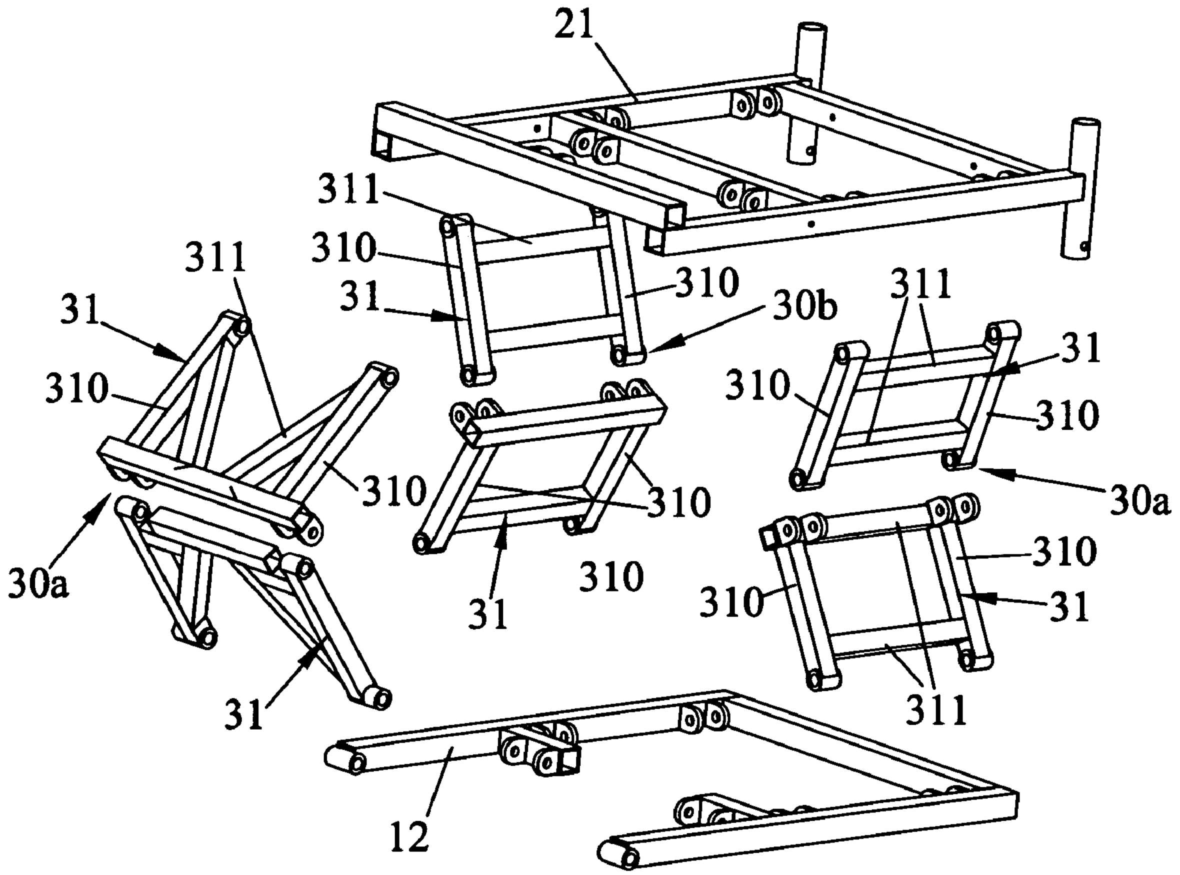
FIG. 2 is an exploded view of the linking rod mechanism of the present invention.
Figure 3:
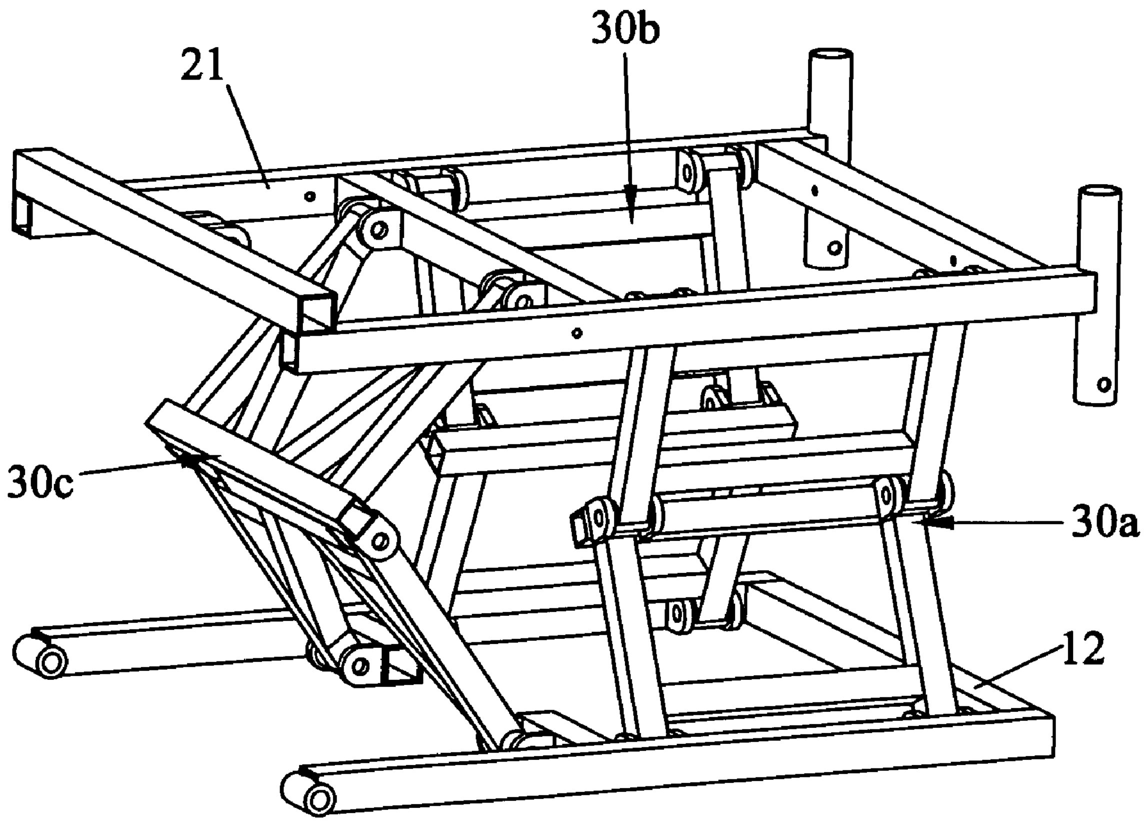
FIG. 3 is a composition diagram of the linking rod mechanism of the present invention.
Figure 4:
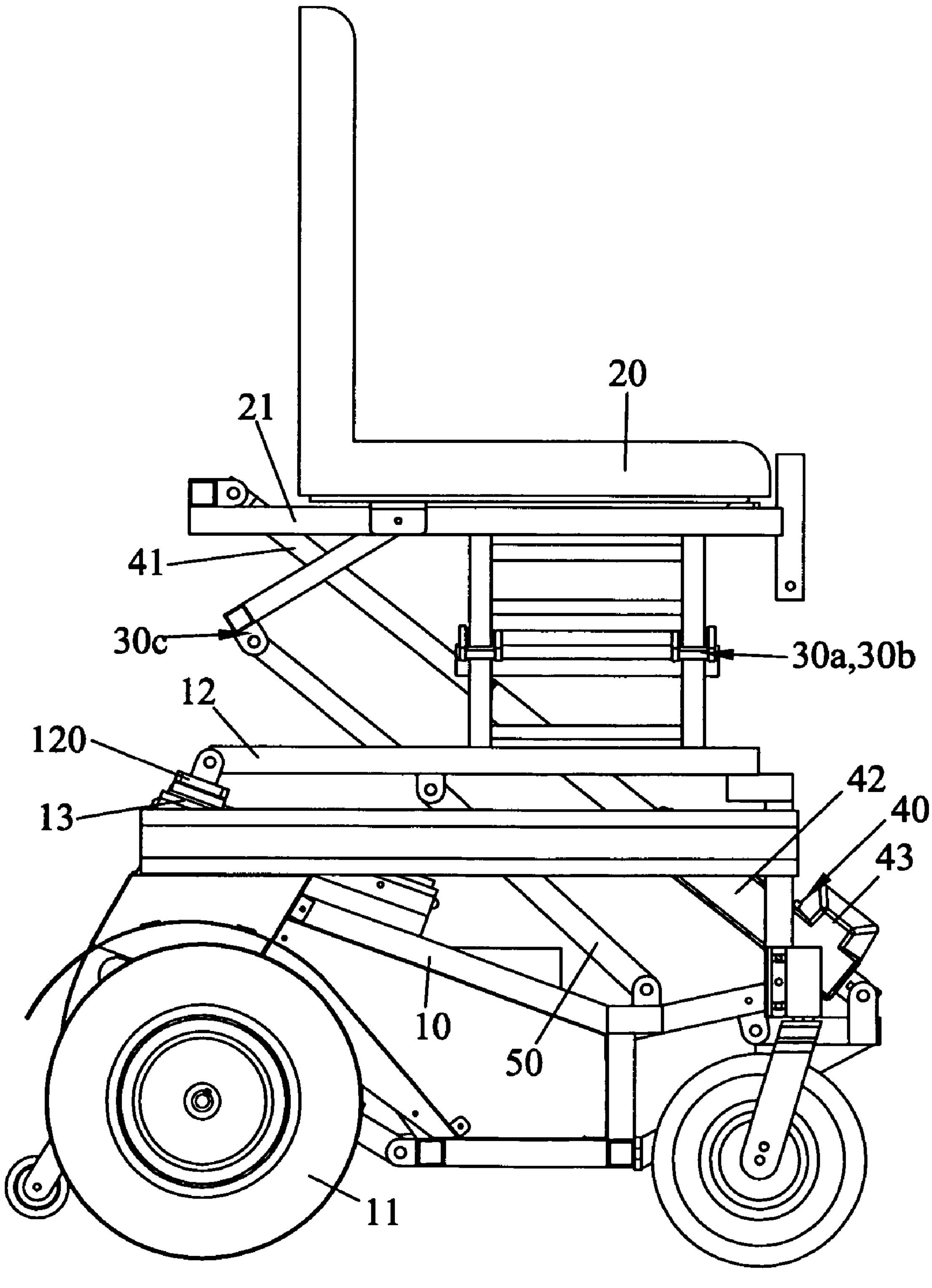
FIG. 4 is a side view showing the rising status of the seat of the present invention.

Referring to FIGS. 1 to 3, the mechanism of this invention can achieve to simply the seat frame, to stabilize the up-down motion, and to minimize the needed space. The basic compositions are:

A cart frame 10, with wheels 11 connected thereon, and having a rear end, a front end and a longitudinal axis extending from the rear end to the front end of the cart frame.

A seat 20.

A linking rod mechanisms 30*a* and 30*b*, each includes plurality connecting frames 31 which are pivot-linked with each others and remains two distal ends, and the two distal ends are respectively connected to the cart frame 10 and the seat 20. In one embodiment of the invention, the cart frame 10 further comprises a primary frame 12, the primary frame 12 is connected to the cart frame 10, the seat 20 is installed on a secondary frame 21, and the two distal ends of the mechanisms 30*a*/30*b* are respectively pivotally connected to the primary frame 12 and the secondary frame 21. One advantage design of afore-mentioned embodiment, the plurality connecting frames of the linking rod mechanisms are foldable within the confined space by the primary frame 12 and the secondary frame 21 so as to minimize the needed space.

A linear motion actuator 40 connects the cart frame 10 and the seat 20 (or the secondary frame 21) moving the seat 20 up and down smoothly with help from the stable supporting of the linking rod mechanisms 30*a*/30*b*/30*c*.

One improved application of this invention reinforces the strength of connection frames 31 by using two parallel connection rods 310, and the two parallel connection rods 310 are connected with each other by plurality connection rods 311 to form a rigid frame.

Figure 6:
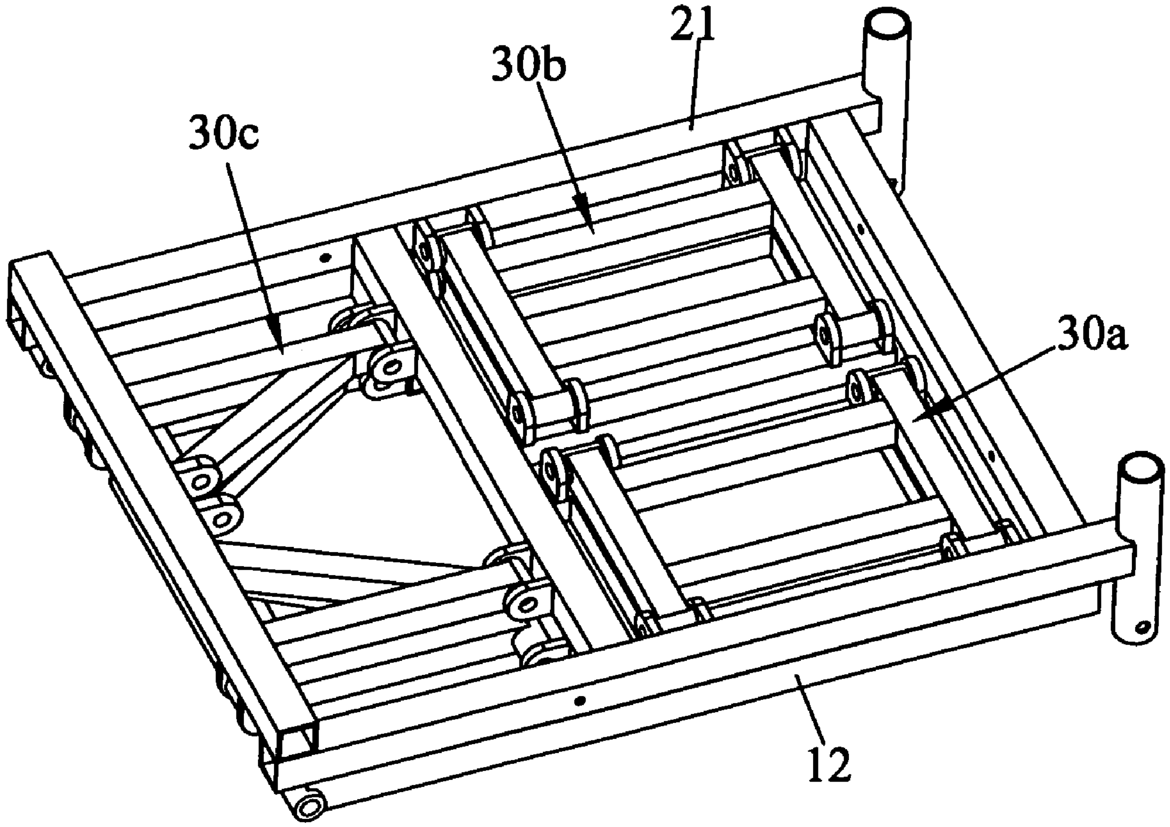
FIG. 6 is a diagram showing the fold status of the linking rod mechanism of the present invention.

Referring to FIGS. 3 and 6, the other improved application of this invention hides the connection frames 31 to enhance a nice figure when the seat 20 (or the secondary frame 21) is adjusted to the lowest position; a primary frame 12 is connected to the cart frame 10, a secondary frame 21 is mounted on the seat 20, the two ends of the connection frames 31 are connected to the primary frame 12 and the secondary frame 21, the connection frames 31 fold within the confined space by the primary frame 12 and the secondary frame 21.

Another improved application of this invention reinforces the structure strength and stability; the connection frames 31 connect to the seat 20 (or the secondary frame 21) with double pivots at one end and connect to the cart frame 10 (or to the primary frame 12) with also double pivots at the other end.

In another improved application of this invention, the triple linking rod mechanisms 30*a*, 30*b* and 30*c* are utilized, and at least two linking rod mechanisms 30*a* and 30*b* are positioned symmetrically about a vertical midplane containing the longitudinal axis extending from the rear end to the front end of the cart frame 10.

In another application of this invention, the linear motion actuator 40 is a kind of motor cylinder that includes a pair of rod 41 and cylinder 42 and a motor 43 to activate the motion.

Figure 7:
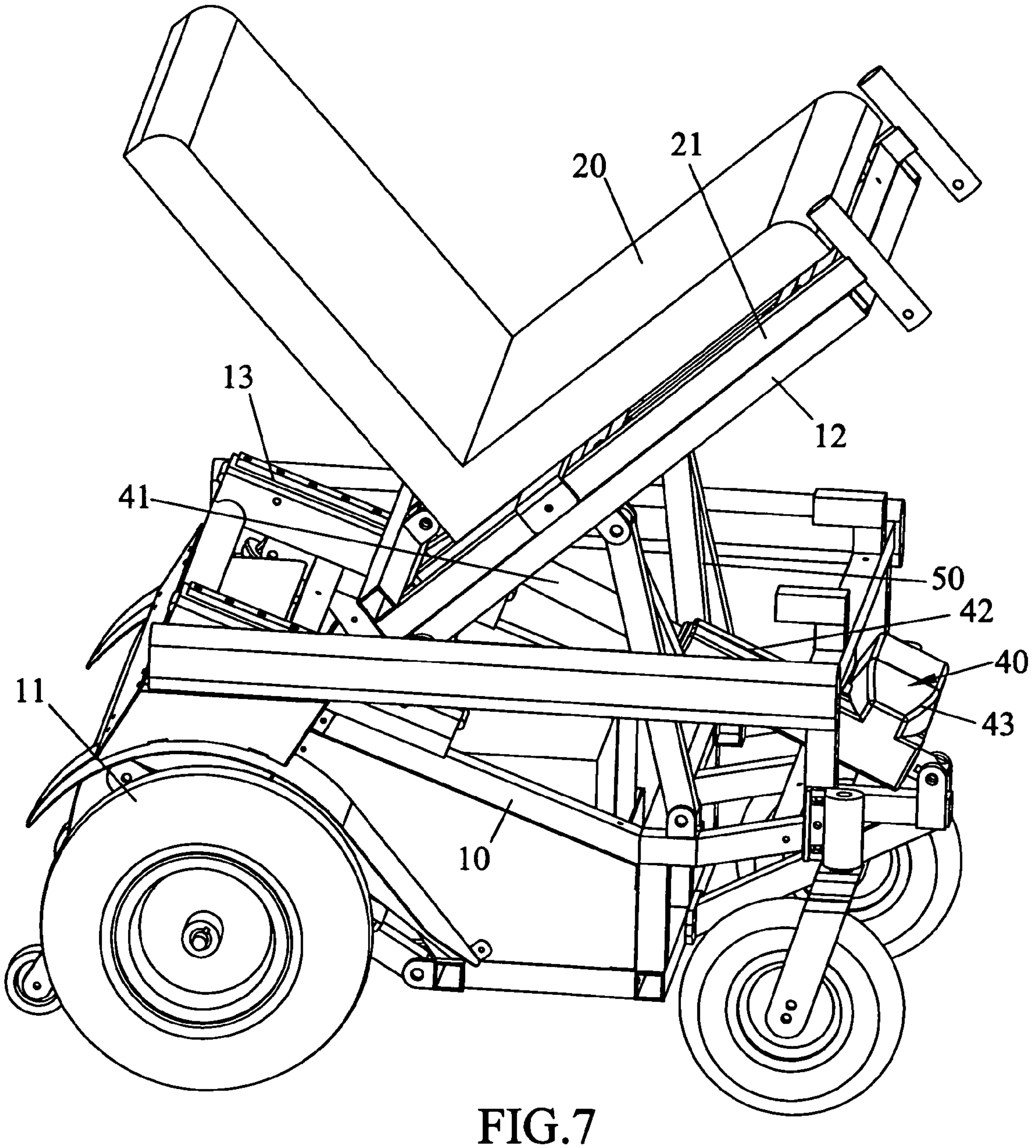
FIG. 7 is a diagram showing the lean status of the seat of the present invention.

Referring to FIGS. 1 and 7, this invention not only has the function of controlling the seat up-down but also the function of controlling the gradient of the seat 20, a mechanism is consisted of two lean slide rails 13 which extend downward to the front of the cart frame 10, the first end of a rigid connecting rod 50 is pivotally connected to the cart frame 10, the second end of the connecting rod 50 is pivotally connected to the middle portion of the primary frame 12, the ends of the connecting frames 31 of the linking rods mechanisms 30*a* and 30*b* are connected to the primary frame 12, one end of the primary frame 12 comprises a slide 120 attached to the slide rail, when the actuator 40 shrinks and drives the seat 20 (or the secondary frame 21), which can move the primary frame 12 in succession and make the slide 120 move to the lower position along the slide rail 13 to make the seat 20 (or the secondary frame 21) in a lean status. The improved application is that the two ends of the connecting rods 31 are pivot-linked to the primary frame 12 and the seat 20 (or the secondary frame 21) with two pivots in order to enhance the strength and stability of the structure.

Referring to FIGS. 1 to 4, the improved application of this invention, when the user wants to rise the seat frame, the user controls the actuator 40, the motor 43 of the actuator 40 operates and drives the rod 41 stretch out relative to the cylinder 42, which makes the whole length longer than the basic length preserved, because the seat 20 (or the secondary frame 21) and the primary frame 12 are connected by at least two linking rod mechanisms 30*a* and 30*b*, every linking rod mechanism 30*a*/30*b* is pivot-linked by several connecting frames 31, which has not only abundant space to stretch, but also the function to prevent the seat 20 from shivering, then the seat 20 can be risen smoothly. When the user wants to make the seat 20 down to the normal position, the user controls the actuator 40, the motor 43 of the actuator 40 operates and drives the rod 41 shrink relative to the cylinder 42, which makes the whole length equal to the basic length preserved, the seat 20 goes down, the connecting frames 31 of the linking rod mechanisms 30*a* and 30*b* fold, the seat 20 and the primary frame 12 are shut and combined with the cart frame 10 into a firm status, which makes the seat 20 down to the normal position and can be driven.

Figure 5:
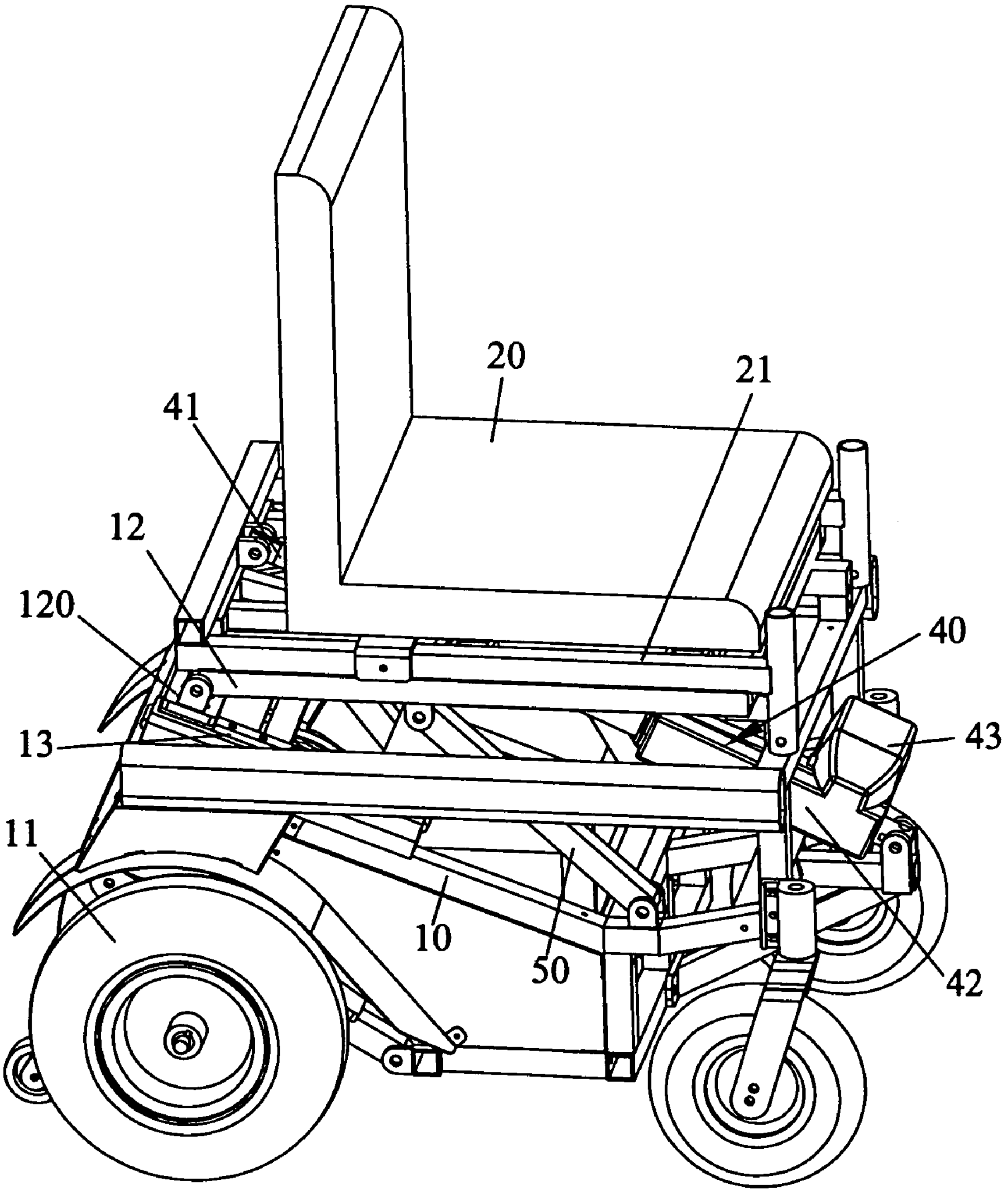
FIG. 5 is a 3-dimensional diagram showing the seat in original status of the present invention.

Referring to FIGS. 5 to 7, when the seat 20 is in a normal position, the user wants to make the seat 20 into a lean status, the user controls the actuator 40, the motor 43 of the actuator 40 operates and drives the rod 41 shrink relative to the cylinder 42, which makes the whole length shorter than the basic length preserved, then the rod 41 of the actuator 40 drives the back end of the seat 20 and the primary frame 12 toward to the front of the cart frame 10, because the slide rail 13 slopes downward to the front of the cart frame 10, the back end of the primary frame 12 moves downward to the front of the cart frame 10 by the slide 120 moving along the slide rail 13, so does the seat 20 (and the secondary frame 21), which cooperating with the connecting rod 50 supported on the middle of the primary frame 12 to make the seat 20 into a lean status like showing in FIGS. 5 and 6. When the user wants to reinstate to the original status, the user controls the actuator 40, the motor 43 of the actuator 40 operates and drives the rod 41 stretch out relative to the cylinder 42, which makes the whole length equal to the basic length preserved, the seat 20 (and the secondary frame 21) and the primary frame 12 reinstate to the horizontal status.

There are the following advantages about this present invention according to the designs said above:

1. The prevent invention can reach the function of the seat frame up-down steadily with the steady support of the at least two linking rod mechanisms, and the whole adjustment mechanism is confined in between the seat frame and the cart frame, which minimize the needed space and make a nice figure.

2. The present invention can be simply designed to have the function of the seat lean, the seat up-down and seat lean can be simply controlled by only one motor cylinder, which can save the cost of the parts and equipments.

While we have shown and described the embodiment in accordance with the present invention, it should be clear to those skilled in the art that further embodiments may be made without departing from the scope of the present invention.

What is claimed is:

1. A seat adjusting mechanism of a motorized wheelchair comprising:

- a cart frame with wheels connected thereon, and having a rear end, a front end and a longitudinal axis extending from the rear end to the front end of the cart frame;
- a seat;
- three linking rod mechanisms, each including two connecting frames and each connecting frame including two parallel connecting rods which are connected to another connecting rods to form a rigid rectangular frame, the two connecting frames of each linking rod mechanism pivot-linked with each other and having two distal ends, the distal ends of each linking rod mechanism respectively connected between the cart frame and the seat, two linking rod mechanisms positioned symmetrically about a vertical midplane containing the longitudinal axis extending from the rear end to the front end of the cart frame; and
- a linear motion actuator connecting the cart frame and the seat so as to actuate the seat frame to move relatively to the cart frame.

2. The seat adjusting mechanism as claimed in claim 1, wherein the cart frame comprises a primary frame, and the seat is mounted on a secondary frame, the primary frame is connected to the cart frame, the two distal ends of the linking rod mechanisms are connected to the primary frame and the secondary frame, the connecting frames of the linking rod mechanisms are foldable within the confined space by the primary frame and the secondary frame.

3. The seat adjusting mechanism as claimed in claim 1, wherein the two distal ends of each of the linking rod mechanism are respectively pivot-linked to the cart frame and the seat frame with two pivots.

4. The seat adjusting mechanism as claimed in claim 1 wherein the linear motion actuator is a motor cylinder which comprises a pair of rod and cylinder, and a motor driving the rod lengthen and shorten relative to the cylinder.

5. The seat adjusting mechanism as claimed in claim 2, wherein the cart frame comprises two lean slide rails which extend downward to the front of the cart frame, the cart frame is pivotally connected a first end of a rigid connecting rod, the rigid connecting rod has a second end which is pivotally connected to the middle portion of the primary frame, one end of the primary frame comprises a slide attached to the slide rails, when the actuator shrinks and drives the seat frame, which can move the primary frame in succession and make the slide move to the lower position along the slide rails to make the seat frame in a lean status.

6. The seat adjusting mechanism as claimed in claim 2, wherein the two distal ends of each linking rod mechanism are pivot-linked to the primary frame and the secondary frame with two pivots.

7. The seat adjusting mechanism as claimed in claim 1, wherein the cart frame comprises a primary frame, and the seat is installed on a secondary frame, the primary frame is installed on the cart frame, the two distal ends of the linking rod mechanisms are connected to the primary frame and the secondary frame, the cart frame comprises two lean slide rails which extend downward to the front of the cart frame, the cart frame is pivotally connected a first end of a rigid connecting rod, the rigid connecting rod has a second end which is pivotally connected to the middle portion of the primary frame, one end of the primary frame comprises a slide attached to the slide rails.

8. A seat adjusting mechanism of a motorized wheelchair comprising:

a cart frame with wheels connected thereon, and having a rear end, a front end and a longitudinal axis extending from the rear end to the front end of the cart frame, the cart frame comprising a primary frame connected thereto;

a seat mounted on a secondary frame;

three linking rod mechanisms, each including two connecting frames and each connecting frame including two parallel connecting rods which are connected to another connecting rods to form a rigid rectangular frame, the connecting frames of the linking rod mechanisms foldable within the confined space by the primary frame and the secondary frame, the two connecting frames of each linking rod mechanism pivot-linked with each other and having two distal ends, the distal ends of each linking rod mechanisms respectively connected between the primary frame on the cart frame and the secondary frame on the seat, wherein two linking rod mechanisms positioned symmetrically about a vertical midplane containing the longitudinal axis extending from the rear end to the front end of the cart frame; and a linear motion actuator connecting the cart frame and the seat so as to actuate the seat frame to move relatively to the cart frame.

9. The seat adjusting mechanism as claimed in claim 8, wherein the linear motion actuator is a motor cylinder which comprises a pair of rod and cylinder, and a motor driving the rod lengthen and shorten relative to the cylinder.

10. The seat adjusting mechanism as claimed in claim 8, wherein the cart frame comprises two lean slide rails which extend downward to the front of the cart frame, the cart frame is pivotally connected a first end of a rigid connecting rod, the rigid connecting rod has a second end which is pivotally connected to the middle portion of the primary frame, one end of the primary frame comprises a slide attached to the slide rails, when the actuator shrinks and drives the seat frame, which can move the primary frame in succession and make the slide move to the lower position along the slide rails to make the seat frame in a lean status.

11. The seat adjusting mechanism as claimed in claim 8, wherein the two distal ends of each linking rod mechanism are pivot-linked to the primary frame and the secondary frame with two pivots.

12. The seat adjusting mechanism as claimed in claim 8, wherein the cart frame comprises a primary frame, and the seat is installed on a secondary frame, the primary frame is installed on the cart frame, the two distal ends of the linking rod mechanisms are connected to the primary frame and the secondary frame, the cart frame comprises two lean slide rails which extend downward to the front of the cart frame, the cart frame is pivotally connected a first end of a rigid connecting rod, the rigid connecting rod has a second end which is pivotally connected to the middle portion of the primary frame, one end of the primary frame comprises a slide attached to the slide rails.

13. A seat adjusting mechanism of a motorized wheelchair comprising:

a cart frame with wheels connected thereon, and having a rear end, a front end and a longitudinal axis extending from the rear end to the front end of the cart frame, the cart frame comprising a primary frame connected thereto and two lean slide rails which extend downward to the front of the cart frame, the cart frame pivotally connected a first end of a rigid connecting rod, the rigid connecting rod having a second end which is pivotally connected to the middle portion of the primary frame, one end of the primary frame comprises a slide attached to the slide rails;

a seat mounted on a secondary frame;

three linking rod mechanisms, each including two connecting frames and each connecting frame including two parallel connecting rods which are connected to another connecting rods to form a rigid rectangular frame, the connecting frames of the linking rod mechanisms foldable within the confined space by the primary frame and the secondary frame, the connecting frames pivot-linked with each other and each including two distal ends, the distal ends of two of the linking rod mechanisms respectively connected between the primary frame on the cart frame and the secondary frame on the seat, two linking rod mechanisms positioned symmetrically about a vertical midplane containing the longitudinal axis extending from the rear end to the front end of the cart frame, a third linking rod mechanism pivotably connected between two respective ends of the cart frame and the seat: and a linear motion actuator connecting the cart frame and the seat so as to actuate the seat frame to move relatively to the cart frame, when the actuator shrinks and drives the seat frame, which move the primary frame in succession and make the slide move to the lower position along the slide rails to make the seat frame in a lean status.

14. The seat adjusting mechanism as claimed in claim 13, wherein the linear motion actuator is a motor cylinder which comprises a pair of rod and cylinder, and a motor driving the rod lengthen and shorten relative to the cylinder.

15. The seat adjusting mechanism as claimed in claim 13, wherein the two distal ends of each linking rod mechanism are pivot-linked to the primary frame and the secondary frame with two pivots.

16. The seat adjusting mechanism as claimed in claim 13, wherein the cart frame comprises a primary frame, and the seat is installed on a secondary frame, the primary frame is installed on the cart frame, the two distal ends of the linking rod mechanisms are connected to the primary frame and the secondary frame, the cart frame comprises two lean slide rails which extend downward to the front of the cart frame, the cart frame is pivotally connected a first end of a rigid connecting rod, the rigid connecting rod has a second end which is pivotally connected to the middle portion of the primary frame, one end of the primary frame comprises a slide attached to the slide rails.

* * * * *